July 25, 1972    M. N. NAGOT ET AL    3,679,449
CREDIT CARD AND METHOD OF POLISHING
Filed July 27, 1970
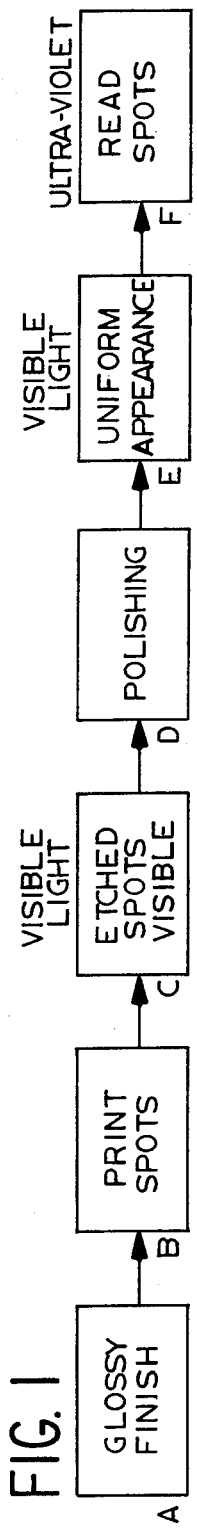
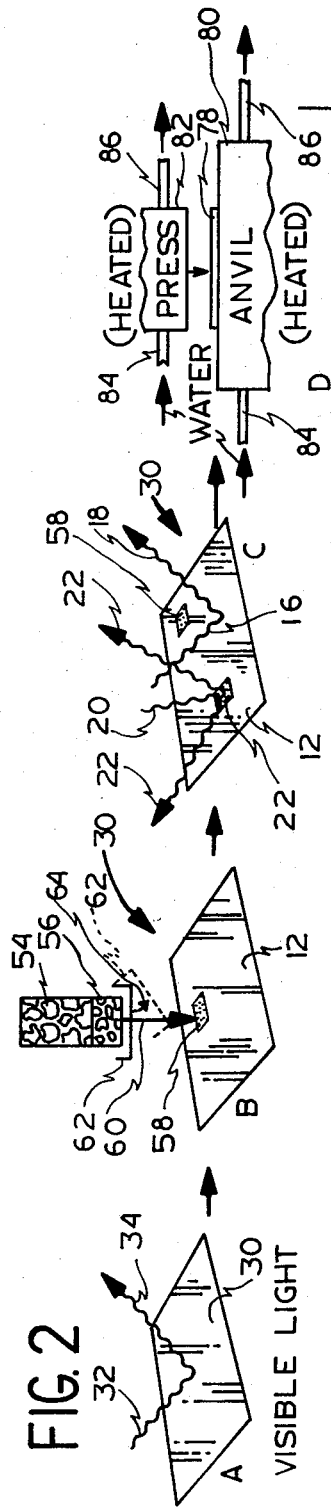
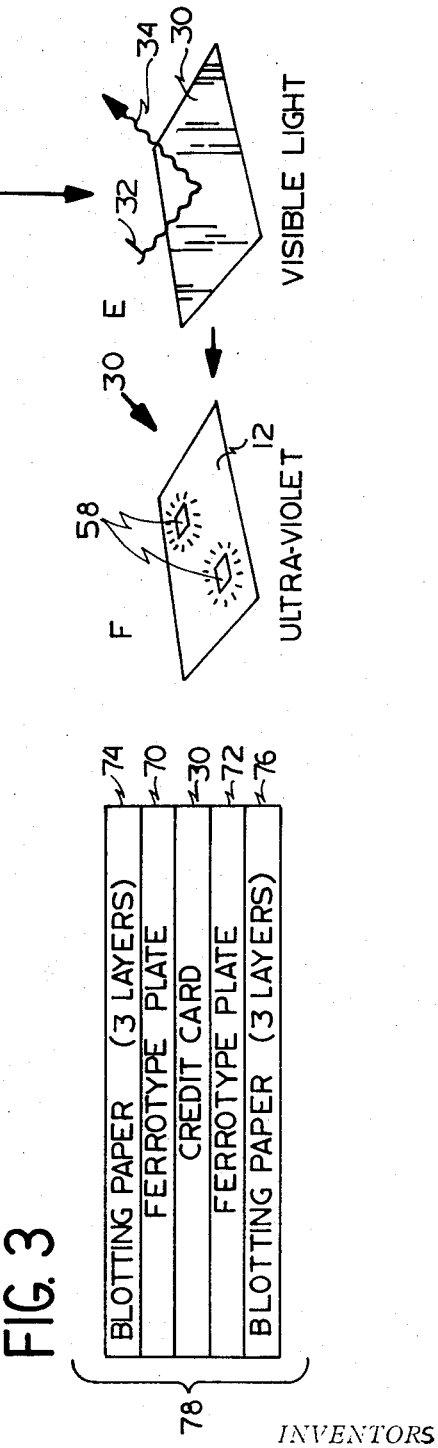
INVENTORS
MARC N. NAGOT
FREDRIC E. ZUCKER
BY
Albert W. Scribner
ATTORNEY

United States Patent Office 3,679,449
Patented July 25, 1972

3,679,449
CREDIT CARD AND METHOD OF POLISHING
Marc N. Nagot, Springdale, and Frederic E. Zucker, Stamford, Conn., assignors to Pitney-Bowes, Inc., Stamford, Conn.
Filed July 27, 1970, Ser. No. 58,493
Int. Cl. B41m *3/14;* B44d *1/44*
U.S. Cl. 117—1    1 Claim

ABSTRACT OF THE DISCLOSURE

A glossy plastic credit card is to be imprinted with a luminescent spot code readable under ultra-violet radiation for use in verification of the subscriber's account. The luminescent market material employed for this purpose is borne in a solvent which attacks the material of the credit card, producing a surface etching effect which is visible under ordinary light. To avoid betraying the existence and location of the luminescent spots in this manner, the card is treated, after luminescent printing, by a heat process to repolish the locations where printing took place, making them indistinguishable from the background under visible light.

FIELD OF THE INVENTION

This invention relates to coded plastic credit cards, and a method of applying a luminescent spot coding to such cards in a manner which renders the spots indistinguishable from the surrounding background area of the card under visible light.

THE PRIOR ART

Credit cards are of major importance as a medium of exchange in our economy. The type of card most commonly used for this purpose is a wallet-sized rectangle formed of glossy-surfaced plastic material, such as polyvinyl chloride (referred to as PVC). The use of credit cards has brought with it certain problems, however, relating to the fact that the cards are sometimes lost, stolen, counterfeited, or misdirected in the mails, or they may be cancelled and not returned by the former subscriber. In addition, there are occasions when even legitimate cards should not be honored for particular purchases because the subscriber's account is temporarily delinquent, or because the amount of the purchase would put the account over its authorized limits.

In order to reduce the economic losses which result from such situations, various methods of credit card verification have been developed. They range from manually checking a credit card identification number against a list of numbers which are not in good standing for one reason or another, to sophisticated electronic equipment which automatically reads coded information recorded on the credit card, and transmits that information to a computer which checks it against a list and promptly returns an answer as to whether the card is or is not acceptable. Card reading devices of this kind employ various types of encoding schemes, including embossed bars, magnetic spots embedded within the material of the card, and various types of printed spot codes which are read by photo-electric means. Of all these techniques, the one which appears to be most reliable, and most resistant to tampering by wrongdoers, is a luminescent spot code which is read photo-electrically. One of the principal advantages of this approach is that the spots can be read reliably under an ultra-violet lamp, but theoretically they are undetectable by ordinary visual inspection when the sole source of illumination is light in the visible range of the spectrum.

The preferred way of printing such luminescent spots on a plastic credit card is to dissolve a luminescent marker material in a liquid solvent, for wet application to the surface of the card. The liquid which serves as the solvent for the luminescent marker material is also a solvent for the PVC or other plastic credit card material, so that the marker material is impregnated into the card to some depth below the surface. Consequently, it is difficult to tamper with the card by removing the marker material, without also grinding away a surface layer of card material. The effects of such grinding would be more or less noticeable, depending on the depth of penetration of the luminescent marker material.

This technique, however, has a side effect which in one respect adversely affects the security of the credit card system. Specifically, when the marker solvent attacks the surface of the plastic credit card, it etches it visibly, leaving each luminescent-printed spot with a dull, matte finish. The surface of the plastic card at all other locations normally has a glossy, smoothly polished finish which reflects visible light in a fairly specular fashion; while the matte finish spots reflect visible light rather diffusely. This makes them stand out visibly against the glossy background under ordinary light, especially when the credit card is held at certain oblique illumination angles. This effect permits wrongdoers to identify which credit cards are protected by a luminescent spot code system, and even permits them to identify which specific spots or code bits have been imprinted on the surface of a particular card. Such information makes it somewhat easier for the wrongdoer to alter a luminescent spot-coded credit card, or at least to avoid using such a credit card in any establishment which he knows is equipped with an ultra-violet credit card reader.

THE INVENTION

In order to prevent the luminescent-printed bits of such a spot code from being visually distinguishable, under ordinary visible light, from the surrounding background area of the card, the present invention contemplates that the background area and the luminescent-printed area shall be made similar in visual appearance as seen under ordinary visible light. Specifically, an entire area on the card, which may comprise both background areas and areas imprinted with luminescent spots, is treated in such a way as to have a uniformly specular reflection characteristic. (A co-pending patent application specifically discloses and claims the concept of uniformly diffuse reflection.) Uniformly specular reflection is achieved by polishing the printed areas, either by mechanical or thermal means, to match the reflection characteristic of the background area. The best way of accomplishing this is by the application of heat and preferably also pressure to the entire area in question, including both background areas and printed areas.

BRIEF DESCRIPTION OF THE DRAWINGS

FIG. 1 is a process flow chart indicating successive steps A through F in a credit card luminescent spot printing and heat polishing process according to this invention.

FIGS. 2A through 2F are a series of sequential views, perspective and diagrammatic respectively, illustrating the physical aspects of steps A through F respectively of FIG. 1.

And FIG. 3 is a diagrammatic view of a sandwich formed of a credit card, ferrotype plates and blotting paper, which is used in process step 2D above.

The same reference numerals refer to the same elements throughout the several views of the drawing.

DETAILED DESCRIPTION OF THE PREFERRED EMBODIMENT

This patent application is concerned with a method of luminescent spot printing which starts (FIGS. 1A and 2A) with a conventional credit card 30 made of a plastic material such as PVC. The production processes normally used for cards of this type leave it with a highly polished surface. This results in a substantially specular reflection characteristic: i.e. a ray of incident light 32 is reflected along a single path 34; giving the card a shiny appearance, particularly as seen by obliquely reflected light.

The card 30 is printed with luminescent marker material at selected locations 58 on the surface of the card, FIGS. 1B and 2B, to produce a spot code representing a credit card identification number. This produces local solvent etching at the printed spots, because the luminescent marker material is borne in a liquid vehicle which is a solvent for PVC or whatever plastic material is used in the credit card. Such local etching gives the printed spots a dull, matte finish (FIG. 1C), which makes them stand out by contrast to a glossy finish in the surrounding background area.

The principal advantage of using a luminescent spot code resides in the fact that the spots are not supposed to be detectable by observation under ordinary visible light, since the luminescent marker material conventionally employed for this purpose is colorless. Under ultra-violet illumination, however, it luminesces brightly, and thus is readily detectable by the human eye or by automatic photo-electric sensing equipment of the type employed in credit card verifying devices.

But because of the local etching effect the coded spots 58 can be detected even under ordinary visible light (FIGS. 1C and 2C). An incident ray 16 of visible light, striking the glossy background area 12, is reflected substantially along a single path 18, i.e. in a specular manner. On the other hand, another ray of incident light 20, which happens to strike one of the code spots 58 having an etched or matte finish, is reflected diffusely along a plurality of different paths 22. This difference in reflection characteristics permits the coded spots 58 to be distinguished from the glossy background area 12 with only visible light for illumination, particularly if the credit card 30 is held at certain oblique angles to the incident light. Consequently, one who is tempted to make unauthorized use of such a credit card would be apprised of the fact that the card is protected by a luminescent spot code, and may take steps to avoid entering an establishment which is equipped with a luminescent spot code verifier device. Worse yet, one who wishes to alter spot coding on such a credit card, will find that such alteration is made somewhat easier by the fact that he can, even under visible light, determine precisely which areas 58 are already printed with luminescent spots, and which areas 12 are not so printed.

The process of this invention, however, imparts a glossy finish to the printed areas 58 by means illustrated in FIGS. 1D, 2D and 3; which makes them look the same as the background area 12.

Thus, the luminescent spots are no longer visually distinguishable under ordinary light. As indicated in FIGS. 1E and 2E, under visible light the luminescent-printed credit card has a uniform visual appearance; specificially, it has a glossy finish over the printed spots 58 and background area 12 alike. Nevertheless, when viewed under ultra-violet light, as indicated in FIGS. 1F and 2F, the luminescent-printed spots 58 stand out against the background area 12 by virtue of their luminescence.

FIG. 2B illustrates the physical details of the luminescent printing step 1B. This step employs a dual density foam applicator comprising an upper foam body 54 of relatively low density and a lower foam body 56 of relatively high density, which is directly in contact with foam body 54. The upper foam body 54 acts as a reservoir for a marking preparation comprising the conventional luminescent marking material, such as Tinopal SFG (Geigy Chemical Corp.) forming a 0.2–1% solution in any suitable volatile organic solvent. The preferred preparation employs methyl ethyl ketone, tetrahydrofuran or similarly volatile liquid as the solvent, and a solute percentage of about 0.2%. Both MEK and THF are sufficiently volatile to evaporate quickly at the conclusion of the printing operation, so that the luminescent material which is printed on a typical spot 58 on the surface of the credit card 30 dries quickly and is fixed to the surface thereof. This avoids smudging and spreading of the luminescent spots, which would interfere with the reading precision of an automatic card verifier device.

The marker preparation stored in the low density foam material 56, which repreatedly transfers the marker preparation to the surface of the credit card 30 during a succession of downward printing strokes (arrow 60) of the applicator 54, 56. A cover plate 62 is normally in place over the foam bodies 54 and 56 to prevent excessive evaporation of the solvent, but swings downwardly to its dashed line position, as indicated by arrow 64, to expose the foam body 56 during each printing stroke.

As previously noted, the problem arises as a result of the fact that the liquid which is employed as a solvent for the luminescent marker material, e.g. MEK or THF, is also a solvent for the PVC or other plastic credit card material, and therefore produces local etching at each luminescent-printed spot 58. In its broadest form, the invention contemplates that all, or at least that part of the surface area of credit card 30 which contains luminescent spots 58 printed thereon, shall be polished in some appropriate manner (e.g. by mechanical grinding or lapping) after the luminescent printing operation. Preferably, however, polishing is accomplished over a wide area, including the background area 12; and is done by the application of heat.

In order to prepare the credit card 30 for heat polishing in accordance with this invention, it is sandwiched between upper and lower ferrotype plates 70 and 72 respectively as seen in FIG. 3. These plates are commercially available items comprising a 0.030 inch thick plate of polished brass plated with chrome. Their purpose is to provide rapid and uniform heat and conduction into the body of the credit card 30, while the polished and chrome-plated surface thereof assures that a glossy finish will be transferred to the credit card to achieve the desired surface reflection characteristics. In addition, about three layers of blotting paper 74 and another three layers of blotting paper 76 are placed above and below the ferrotype plates 70 and 72 respectively, in order to provide compressible physical cushions, and avoid undue thermal shock. In the aggregate, these layers 30 and 72 through 76 comprise a sandwich generally designated 78.

Then, as seen in FIG. 2D, the entire sandwich 78 is placed upon an anvil 80 directly below a hydraulically operated press 82 capable of developing a compression of about ten tons for each credit card sandwich 78 processed simultaneously.

The press 82 and anvil 80 are both heated to about 250° F., and the press is lowered to compress and heat the sandwich 78 for a period of about three minutes. Then, while the sandwich 78 is still compressed in this manner, cooling water is introduced into appropriate jackets in the press 82 and anvil 80 through conduits 84 and outlets 86 in to cool the credit card 30 relatively rapidly while it still has a surface gloss. The advantage of heating and also cooling both credit card surfaces, instead of heating and cooling from only one side thereof, is that both these thermal transitions are more uniform, as a result of which credit card warping is avoided. The heat polishing step illustrated in FIG. 2D, and the credit card sandwich 78 which is used for that purpose, are similar to conventional heat polishing processes which are standard in the credit card industry for the initial manufacture of credit cards with glossy surfaces.

Thus, after the heat polishing operation of FIG. 2D is performed and regardless of how many luminescent coded spots 58 are printed the credit card 30 has the uniform glossy finish illustrated in FIG. 2E when illuminated by visible light. Consequently, it is impossible to determine, under such illumination, where the luminescent spots are located, or indeed if there are any such spots at all on the credit card 30. Note that the uniform glossy finish of the printed credit card 30 as seen in FIG. 2E is undistinguishable from the appearance of the same credit card in FIG. 2A, prior to luminescent printing.

Under ultra-violet light, however, as seen in FIG. 2F, every luminescent code spot 58 which has been printed on the credit card 30 is immediately visible against the unprinted background area 12. Thus, the ideal situation has been achieved, in which the code spots 58 stand out readily against the background area 12 when viewed under ultra-violet light, but blend completely into the glossy background when viewed under visible light.

Plastic credit cards may also be supplied by the manufacturer with a surface finish which is not highly polished, but instead has a slight surface roughness giving it a somewhat duller light reflection characteristic. It is nevertheless preferable for luminescent spot-coded credit cards of this type to be treated in accordance with this invention. Even if the surface finish of the card is not highly reflective, it is still substantially more reflective than the same surface will be after etching by luminescent marker solvent. Therefore, the printed spots will still be quite clearly distinguishable to the eye under ordinary visible light, even though the contrast relative to the background is not as great in this instance as it is with a very glossy credit card of the type discussed above. Consequently, some form of polishing is recommended in order to make the printed areas sufficiently glossy to produce a good visual match with the background areas. In particular, the overall application of heat, to printed and background areas alike, polishes both of them to a higher gloss assuring the desired visual uniformity throughout.

In addition, the invention has another very significant advantage. The underlying reason for employing a solvent-borne luminescent printing approach for credit card coding is that the luminescent marker solvent, since it is also a PVC solvent, causes the luminescent marker material to penetrate below the surface of the credit card, thus making it more difficult for anyone to alter the card. This is true of any plastic credit card which is imprinted by a solvent process, even if some treatment in accordance with this invention is not employed. It has been discovered, however, that when the heat polishing treatment taught herein is employed, the effect is to increase the penetration of the luminescent marker material into the depth of the credit card to a surprising extent.

Apparently, the application of heat softens the credit card material to a substantial depth below the surface; and if this is done soon after the luminescent marker printing operation, while some of the marker-bearing solvent remains below the surface layer, it penetrates more readily, delivering the luminescent marker material to a substantially greater depth than could have been achieved otherwise. The resulting luminescent-printed credit card is substantially more secure against surface alteration than credit cards prepared according to prior art luminescent printing processes.

Since with foregoing description and drawings are merely illustrative, the scope of protection of the invention has been more broadly stated in the following claim; and it should be liberally interpreted so as to obtain the benefit of all equivalents to which the invention is fairly entitled.

The embodiments of the invention in which an exclusive property or privilege is claimed are defined as follows:

1. A method of preparing an encoded plastic credit card having a glossy surface: comprising the steps of printing on said surface of said card a series of coded spots with a liquid marking material containing a luminescent material carried in a solvent for the plastic material of which said card surface is made, the spots when so printed having under normal light different light reflective characteristics than the adjacent portions of said glossy surface; and polishing by heat and pressure the surfaces of said spots so that their light reflective characteristics are substantially the same as that for said adjacent portions of said card surface whereby said printed spots are substantially visibly undetectable under normal lighting conditions.

References Cited

UNITED STATES PATENTS

| | | | |
|---|---|---|---|
| 3,468,046 | 9/1969 | Makishima | 283—6 |
| 2,790,727 | 4/1957 | Hilborn | 117—63 |
| 3,135,622 | 6/1964 | Ranalli | 117—47 R |

WILLIAM D. MARTIN, Primary Examiner

W. R. TRENOR, Assistant Examiner

U.S. Cl. X.R.

40—2.2; 117—1.7, 15, 38, 47A, 63, 64R, 159; 283—8